United States Patent

Geringer

Patent Number: 5,603,348
Date of Patent: Feb. 18, 1997

[54] DAMPED POPPET VALVE

[75] Inventor: Kerry G. Geringer, Ames, Iowa

[73] Assignee: Sauer Inc., Ames, Iowa

[21] Appl. No.: 432,513

[22] Filed: May 1, 1995

[51] Int. Cl.⁶ .................................................. F16K 21/10
[52] U.S. Cl. ........................ 137/514.7; 137/454.5
[58] Field of Search .................... 137/514.5, 514.7, 137/454.5

[56] References Cited

U.S. PATENT DOCUMENTS

| | | |
|---|---|---|
| 2,289,946 | 7/1942 | Weatherhead, Jr. . |
| 2,490,511 | 12/1949 | Courtot . |
| 2,918,083 | 12/1959 | Clark, Jr. et al. . |
| 3,438,393 | 4/1969 | Godley, II . |
| 3,550,617 | 12/1970 | Johnson ........................ 137/514.5 |
| 3,605,802 | 9/1971 | Hertell ........................ 137/514.5 |
| 4,217,927 | 8/1980 | Morita ........................ 137/454.5 X |
| 4,270,569 | 6/1981 | Reay et al. .................. 137/514.7 |
| 4,967,791 | 11/1990 | Sternberger . |
| 5,183,075 | 2/1993 | Stein ........................ 137/514.5 X |
| 5,255,704 | 10/1993 | Bennett ........................ 137/454.5 |

*Primary Examiner*—Hoang Nguyen
*Attorney, Agent, or Firm*—Zarley, McKee, Thomte, Voorhees, & Sease

[57] ABSTRACT

A valve includes a body member having spaced apart first and second fluid passages and a bore in communication with the passages. The bore includes a valve seat interposed at one end of the bore between the first and second fluid passages, a discharge chamber opposite the first fluid passage and between the valve seat and the second fluid passage, and a valve spring cavity/dampening chamber at the end of the bore distal from the seat. The valve has a poppet engaged and yieldingly urged into sealing engagement with the valve seat by a spring disposed in the valve spring cavity. The poppet has a seating portion at its forward end, a stem portion at its rearward end, and a raised central portion interposed therebetween. Part of the poppet is guidingly received by the spring cavity in a controlled clearance fit so as to allow fluid to exert dampening pressure on the spring and guide the poppet in an axial direction. Improved valve performance is benefits are also realized when the central portion includes a vent groove thereon.

16 Claims, 2 Drawing Sheets

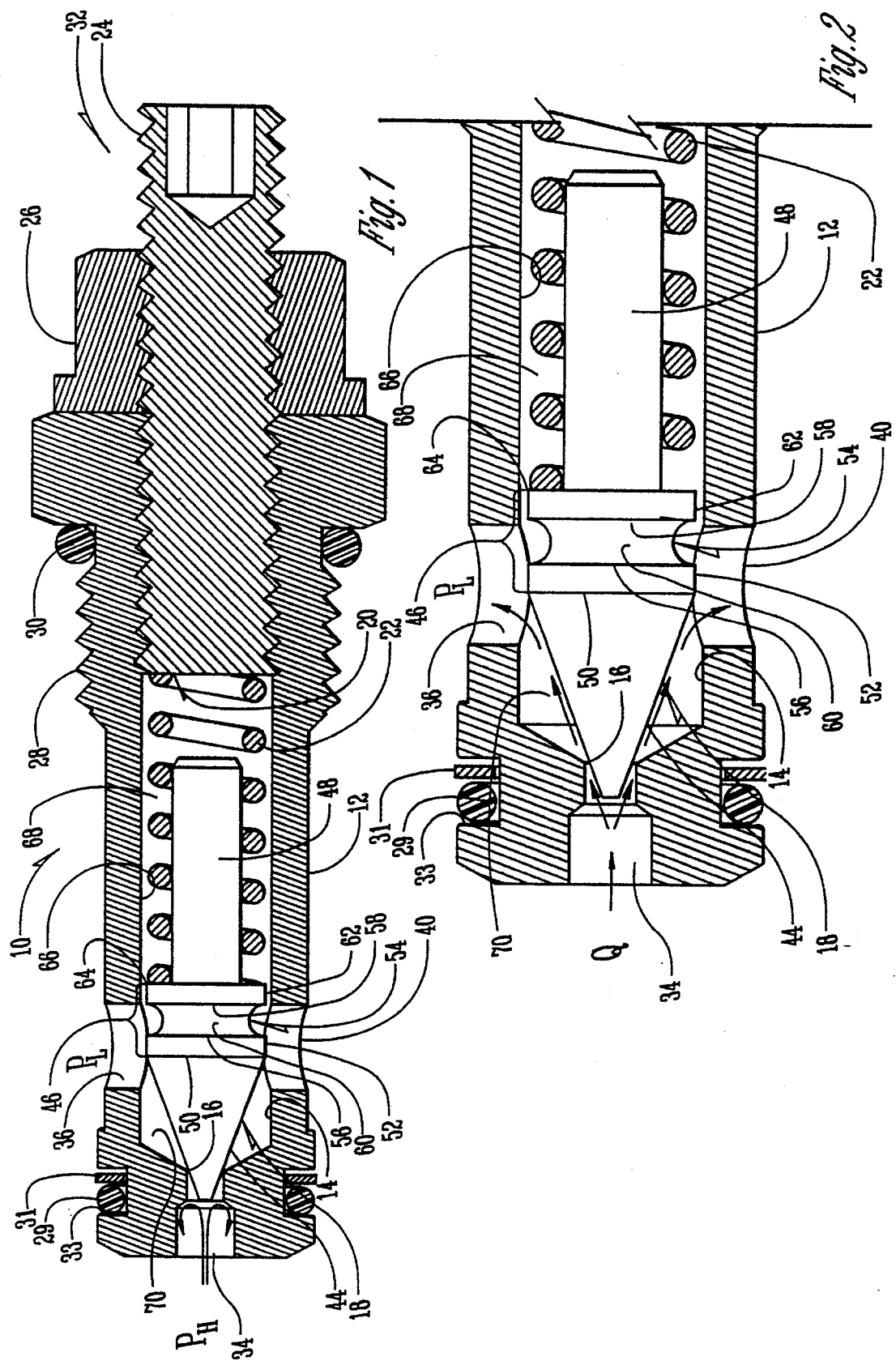

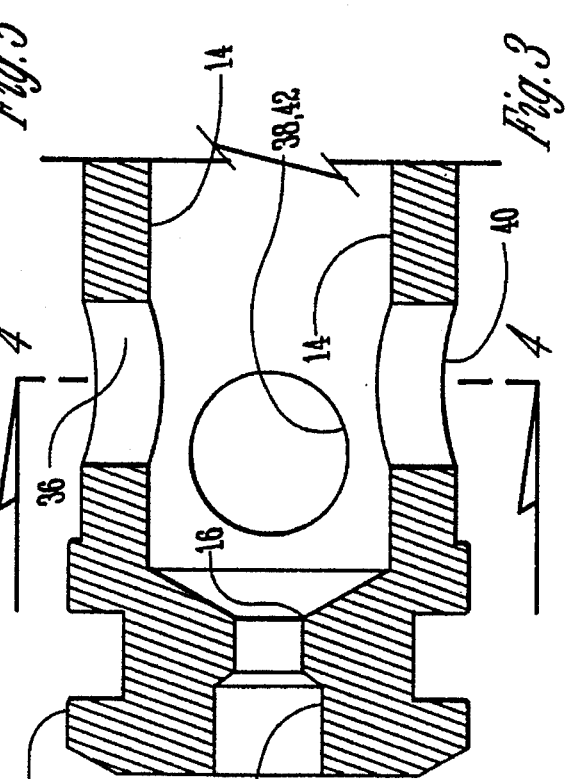
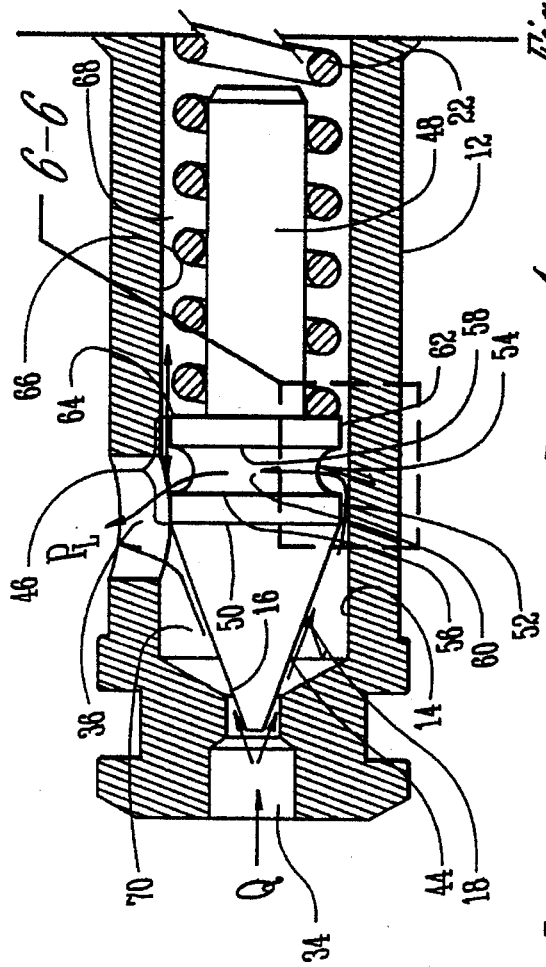
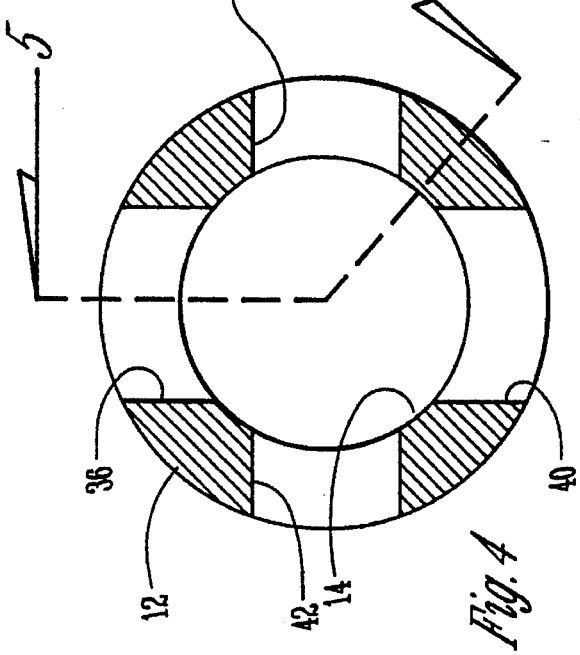
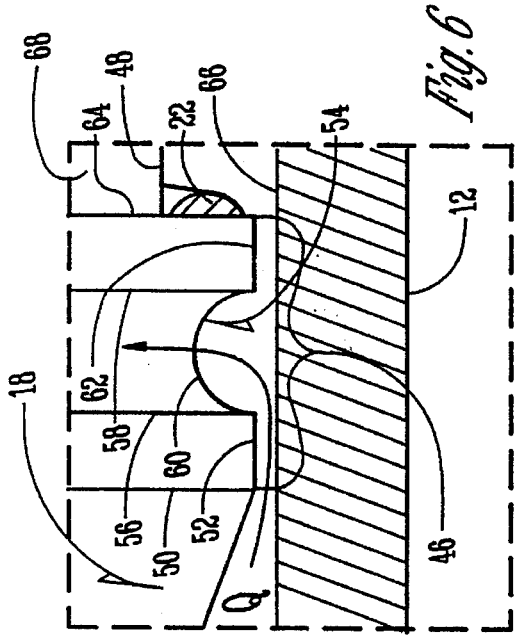

DAMPED POPPET VALVE

BACKGROUND OF THE INVENTION

The present invention relates to the field of hydraulics, more particularly to high pressure poppet valves. This invention provides improved dampening, which results in greater stability in such valves.

Hydraulic systems and controls connected thereto often require valves for relieving fluid from a first passage having a relatively high fluid pressure to a second passage having a relatively low fluid pressure. For instance, a pilot operated pressure regulating system for open circuit pumps requires a high pressure pilot relief valve. Various high pressure relief valve configurations are known in the art of hydraulics.

One configuration, known as a poppet valve, utilizes a poppet that is spring biased into engagement with a seat at the bottom of a valve bore. During operation of the poppet valve, the poppet disengages from the seat or "cracks off" when the pressure on the seat area balances the spring force. The "cracking pressure" of the valve is the pressure at which the poppet cracks off the seat. High velocity fluid then flows adjacent the poppet. As the kinetic energy of the fluid is dissipated in the discharge chamber, a great deal of turbulence is typically generated and the poppet may become unstable as a result. Because of the high pressures and fluid velocities encountered, conventional poppet valves often exhibit unstable performance, rapid wearing of the valve seat and/or poppet, high valve leakage and degradation of the valve seat pressure.

Various measures have been tried to eliminate the shortcomings noted above. Increasing the spring rate of the valve improved stability, but resulted in adjustment problems due to the higher spring rate. Furthermore, the gain or flow/pressure relationship was reduced to an undesirable level. Existing poppet valve designs have also addressed the wear problem by using harder and more exotic materials on the valve seat and/or the poppet. Unfortunately, such measures tended to increase the manufacturing costs for these components.

Therefore, a primary objective of the present invention is the provision of a high pressure relief valve that represents an improvement over existing high pressure relief valves.

Another objective of the present invention is the provision of a poppet-style high pressure relief valve which has excellent repeatability and predictable flow/pressure characteristics.

Another objective of the present invention is the provision of a valve having stable operating characteristics.

Another objective of the present invention is the provision of a valve having low leakage when operating below its cracking pressure.

Another objective of the present invention is the provision of a valve that can be accurately adjusted and has good resolution during adjustment.

A further objective of the present invention is the provision of a valve having a relatively long life with little degradation in terms of the setting or leakage over the life of the valve.

A further objective of the present invention is the provision of a valve that is relatively quiet in use.

A further objective of the present invention is the provision of a valve that is economical to manufacture and durable in use.

These and other objectives will become apparent to one skilled in the art from the description which follows and the accompanying drawings.

SUMMARY OF THE INVENTION

The present invention provides a valve for high pressure hydraulic devices. The valve includes a body member having spaced apart first and second fluid passages and a bore in communication with the passages. The bore includes a valve seat interposed at one end of the bore between the first and second fluid passages, a discharge chamber opposite the first fluid passage and between the valve seat and the second fluid passage, and a dampening chamber coextensive or co-located with a valve spring cavity at the end of the bore distal from the seat.

The valve also has a poppet disposed in the bore and a spring disposed in the valve spring cavity that engages the poppet and yieldingly urges it into sealing engagement with the seat. The poppet has a seating portion at its forward end and a stem portion at its rearward end. The rear part of the central portion of the poppet has a cylindrical sealing land that is guidingly received by the spring cavity in a controlled clearance fit. Fluid can flow through the gap and get behind the central portion of the poppet to exert dampening forces on the poppet. Furthermore, the spring cavity/dampening chamber guides the poppet in an axial direction. Improved valve performance is also realized when the central portion of the poppet includes a vent groove thereon.

BRIEF DESCRIPTION OF THE DRAWINGS

FIG. 1 is a sectional view of the valve of this invention in a closed position, wherein the poppet is sealed against the seat.

FIG. 2 is an enlarged sectional view of the forward portion of the valve shown in FIG. 1, except that the valve is unseated so as to allow fluid to flow as shown.

FIG. 3 is an enlarged cross-sectional view of the lower portion of the body member of the valve of this invention with the poppet and spring removed.

FIG. 4 is a sectional view taken along line 4—4 in FIG. 3 showing the plurality of fluid passages intersecting the valve bore of this invention.

FIG. 5 is a sectional view taken along line 5—5 in FIG. 4 with the spring and poppet reinserted so as to show the dampening chamber and vent groove of the present invention.

FIG. 6 is an enlarged view of area 6—6 in FIG. 5, which illustrates the flow of fluid around the poppet when the valve of the present invention is open.

DETAILED DESCRIPTION OF THE PREFERRED EMBODIMENT

The present invention is a high pressure relief valve. In FIG. 1 and the description which follows, the valve of the present invention is generally denoted by the reference numeral 10. The valve 10 includes an elongated body member 12 having an elongated bore 14 therein. A seat 16 having a round central opening therein is formed in the body member 12 at one end of the bore 14. A poppet 18 is disposed in the bore 14 adjacent to the seat 16. The forward end of the poppet 18 and the seat 16 have complementary shapes so as to mate in sealing engagement. This invention is not restricted to a particular shape at the seat, but a frustum of a cone is shown and preferred. A spring means 20 is disposed in the bore 14 and engages the poppet 18 so as to bias the poppet 18 into engagement with the seat 16. The biasing force of spring means 20 is adjustable.

The spring means 20 comprises a spring 22, preferably a helically coiled compression spring, whose spring force is made adjustable by an elongated threaded rod 24 operatively connected to the spring 22. The rod 24 is in sealed threaded engagement with the body member 12. Suitable means are provided at the end of the threaded rod 24 opposite the spring 22 for turning the elongated threaded rod 24 by hand or with a tool. A sealing/locking nut 26 securely attaches the threaded rod 24 to the body member 12, but still allows the rod 24 to be moved to compress the spring 22. It is also contemplated that the spring means 20 can be adjusted by a hydraulic means, such as a servo. Such an arrangement would allow the damped poppet valve 10 to be adjusted remotely.

Preferably, the body member 12 comprises a shell with an outer surface having threads 28 thereon and an O-ring 30 disposed above the threads 28. Thus, the body member 12, the poppet 18, the spring 22, the threaded rod 24, and the sealing/locking nut 26 can be constructed as an integral cartridge 32. The cartridge 32 can be threadably attached in sealed connection with a hydraulic device (not shown) by means of the threads 28 and the O-ring 30. The cartridge 32 includes an O-ring 29 and a backup ring 31 that are installed in a groove 33 to prevent fluid from leaking around the lower outside portion of the cartridge and between the passages.

The hydraulic device is prepared to accept the cartridge 32 by having a bore formed therein for accepting the cartridge. Holes and passages corresponding to the holes and the passages of the cartridge 32 are also provided in the hydraulic device. Of course, the individual components of the valve 10 can also be mounted directly in the hydraulic device, without the casing or shell if the integral separability of a cartridge is not desired.

At one of its ends, the bore 14 is selectively in communication with a first fluid passage 34 connected to a source of high pressure fluid (not shown). The presence of high pressure fluid at passage 34 is indicated by the reference letter $P_H$ in FIG. 1. A second fluid passage 36 extends through the body member 12 and intersects the bore 14 above the seat 16 and below the spring 22.

Preferably, additional second fluid passages 38, 40 and 42 are radially spaced at 90° intervals around the body member 12, as best seen in FIG. 3 and 4. As is known in the art, the passages 36–40 are sized to provide sufficient flow area to drain the high pressure fluid from the opened valve 10. Second fluid passages 38 and 42 are axially offset from or spaced axially forward of passages 36 and 40 along the bore 14. The reason for the offset passages will be understood after the structure of the poppet 18 and the operation of the valve 10 are explained below.

Referring again to FIG. 1, the poppet 18 has a seating portion 44 adjacent the seat 16. Preferably, the seating portion 44 has the shape of a frustum of a cone whose apex extends through the seat 16. Seat 16 preferably has a circular cross-section. Thus, a circular ring of contact exists between the seating portion 44 and the seat 16 when the valve 10 is in the closed or seated position shown in FIG. 1.

The poppet 18 also includes a raised central portion 46 located adjacent to the seating portion 44. Of course, the raised central portion 46 is smaller in diameter than the bore 14. When assembled into the valve, the central portion 46 of the poppet 18 axially overlaps the passages 36 and 40 as best understood from FIGS. 1–3, and 5. Finally, the poppet 18 includes a stem portion adjacent the central portion 46 and opposite the seating portion 44. The stem portion 48 is preferably cylindrical, having an outside diameter smaller than the diameter of the central portion 46. Referring to FIG. 1, the outside diameter of the stem portion 48 is adapted to guidingly engage the spring 22 at its inside diameter.

As best seen in FIG. 2, the raised central portion 46 includes a forward edge 50 delimiting it from the adjacent seating portion 44. A cylindrical forward sealing land 52 is disposed adjacent the forward edge 50 and in proximity with the wall of the bore 14.

Preferably, the central portion 46 further includes a vent means, such as an annular vent groove 54 in the poppet 18 rearwardly adjacent the forward sealing land 52. The groove 54 axially overlaps the second fluid passages 36 and 40 so as to provide fluid communication between them. The vent groove 54 is delimited by side edges 56 and 58 and includes a trough portion 60 therebetween. The side edge 56 delimits the intersection of the forward sealing land 52 and the annular groove 54. The side edge 58 delimits the intersection between the annular groove 54 and a rearward sealing land 62 which is preferably, although not mandatorily, substantially identical to the forward sealing land 52. A shoulder 64 is formed on the poppet 18 between the stem portion 48 and the rearward edge of the rearward sealing land 62. The shoulder 64 provides a location for the spring 22 to engage the poppet 18.

FIG. 1 shows that the spring 22 resides in a spring cavity 66 within the bore 14. The spring cavity 66 is adjustably delimited on one end by the threaded rod 24. Theoretically, the other end of the spring cavity 66 could extend until it almost intersects the passages 36 and 40. Therefore, in effect, the rearward sealing land 62 of the central portion 46 of the poppet 18 resides in and is guidingly received by the spring cavity 66. However, when the valve 10 is assembled, the lower end of the spring cavity 66 is effectively delimited by the shoulder 64 on the poppet 18. The area between the stem portion 48, the spring 22 and the spring cavity 66 of the bore 14 defines a dampening chamber 68 that is essentially coextensive with or co-located within the spring cavity 66. The tight diametrical clearance or gap between the bore 14, especially the spring cavity, and the sealing land 62 is closely controlled to achieve the desired dampening effects. Another result is that the movement of the poppet 18 is substantially confined to the axial directions. Radial movement is undesirable because it can lead to excessive wearing or even jamming of the poppet 18.

The clearance plays an important factor in the performance, life, and dampening of the valve 10. When the valve 10 is modulating, high fluid velocities are encountered. Fluid velocities of approximately 1000 feet/second are not uncommon. The poppets in conventional valves are prone to oscillate at high frequencies, typically several thousand cycles per second (Hertz). Although it is difficult to say what causes high frequency oscillations of the poppet, adequate dampening tends to eliminate them. The appropriate clearance leads to adequate dampening.

Dampening occurs when pressure changes in the spring cavity 66 tend to oppose the movement of the poppet 18. The average pressure in the spring cavity 66 is approximately equal to $P_L$ because the annular gap between the wall of the bore 14 and the poppet sealing land 62 generally allows fluid to flow freely between the spring cavity 66/dampening chamber 68 and the second fluid passages 36–42 (see the upper portion of FIG. 5). However, when the poppet 18 moves quickly away from the seat 16, fluid must be displaced out of the spring cavity through the gap. The gap is designed not to fully accommodate this increased instantaneous flow and acts as a restriction- Therefore, the pressure in the spring cavity 66 increases and the resulting forces retard the motion of the poppet 18. When the poppet 18 moves quickly toward the seat 16, fluid must be drawn into the spring cavity 66 through the gap. The gap cannot provide the demanded instantaneous flow and again acts as a restrictor. Thus, the pressure in the spring cavity decreases and again tends to retard the motion of the poppet 18. In summary, the pressure changes in the spring cavity 66 always tend to oppose the movement of the poppet 18. The faster the poppet 18 tries to move, the faster its motion is retarded or dampened. Lower frequency movement is allowed, but higher frequency movement is dampened.

Too much diametrical clearance results in too little dampening. Significant dampening of unwanted high frequency oscillations does not occur. The flow that the poppet oscillations generate through the gap will not generate enough of a pressure change in the spring cavity to dampen the high frequency movements. Furthermore, the valve 10 can be noisy and emit an objectionable whistling sound. Another consequence of having too much diametrical clearance, and thus too little dampening, is that high frequency oscillation of the poppet 18 causes excessive wear at the seat 16 and/or the poppet seating portion 44. Such wear can also lead to degradation of the pressure setting of the valve 10 and even premature failure of the valve 10.

On the other hand, too small of a diametrical clearance between the rearward sealing land 62 and the bore 14 effectively seals off the spring cavity 66 from the passages 36–42. Too much dampening occurs. The axial motion of the poppet 18 is inhibited by what amounts to a hydraulic lock. The valve is sluggish or unresponsive and will not regulate flow properly.

The proper clearance depends on a number of known factors including the masses of the spring and the poppet, the viscosity of the fluid, etc. In the preferred embodiment of the present invention, the diameter of the poppet at the rearward sealing land 62 is 6.900±0.032 mm while the diameter of the bore 14 in the spring cavity 66 is 7.04±0.04 mm. Thus, the nominal diametrical clearance or annular gap is 0.140 mm. Without undue experimentation, one skilled in the art can extrapolate or otherwise determine the nominal clearance required for other valves sizes. Thereafter, one can also easily determine the appropriate manufacturing tolerances.

Based on FIGS. 2 and 5, it should be apparent that the dampening chamber 68 is coextensive with the spring cavity 66. The dampening chamber 68 is axially delimited at one end by the intersection of the rearward sealing land 62 and the shoulder 64 and at the other end by the threaded rod 24. The forward edge 50 of the sealing land 52 also delimits the upper end of a discharge chamber 70. The seat 16 delimits the lower end of the discharge chamber 70.

OPERATION

The operation of the damped poppet valve 10 can best be understood in view of FIGS. 1, 2, 5 and 6. FIG. 1 shows the poppet 18 seated against the seat 16 by the force of the spring 22, thereby defining the closed position of the valve 10. In the closed position, the valve prevents fluid from flowing from the first (high pressure) passage 34 to the second (low pressure) fluid passages 36–40 through the bore 14. When the high pressure $P_H$ in passage 34 exceeds the "cracking pressure" of the valve, the poppet 18 will be unseated. For a valve 10 having a poppet of given seat area, the cracking pressure is established primarily by the threaded rod 24 and the spring 22.

In FIG. 2, the pressure $P_H$ exceeds the cracking pressure and forces the seating portion 44 of the poppet 18 out of engagement with the seat 16. Thus, a flow of high pressure fluid Q escapes the first fluid passage 34 and travels upwardly adjacent the conical seating portion 44 to exit through one of the second fluid passages 36–42. Thus, the valve 10 relieves the pressure $P_H$ in the first fluid passage 34 to a source of lower pressure $P_L$.

FIG. 5 shows the valve 10 fully opened and illustrates the venting aspect of the present invention. The distance that the poppet 18 moves away from the seat 16 depends on the flow desired. When the valve 10 is applied as a pilot valve, the range of movement of the poppet 18 away from the seat 16 is quite small, i.e. —less than 0.020 inches maximum. Fluid flows from the first passage 34 into the discharge chamber 70. The fluid flow Q extends upwardly along the seating portion 44. Most of the higher velocity fluid is almost immediately discharged through the fluid passages 38 and 42.

Some of the fluid Q continues upward alongside the poppet 18 until it squeezes between the forward sealing land 52 and the wall of the bore 14, thus losing most of its fluid momentum in the process. As shown in FIGS. 5 and 6, that fluid is discharged through the passages 36 and 40 via the vent groove 54. The annular groove 54, which is also referred to as a vent groove, is generally adjacent to and registered with the additional second fluid passages 36 and 40. Because of their proximity to the annular vent groove 54, the second fluid passages 36 and 40 vent most of the fluid from the dampening chamber 68. (See FIG. 5.)

The vent groove 54 prevents high velocity fluid from flowing behind the shoulder 64 where it would tend to accumulate because its drainage is restricted by the gap. The high velocity fluid creates an artificial backpressure. Thus, the pressure in the spring cavity 66 would increase, tending to reseat the poppet 18. The sealing land 52 and the vent groove 54 effectively isolate the dampening chamber 68 from the high velocity, very turbulent fluid found in the discharge chamber 70. This allows controlled hydraulic dampening to take place without discharge turbulence from the high velocity, high momentum fluid adversely affecting performance characteristics.

The controlled fluid flow into and out of the dampening chamber 68 provides hydraulic dampening of the movement of the poppet 18. Undesirable high frequency oscillations are dampened out much like a shock absorber dampens out high frequency road vibrations for an automobile. Although the instantaneous pressure will vary as the poppet oscillates, the average pressure in the dampening chamber will equal the reference pressure $P_L$ outside the valve 10. The pressurized fluid in the spring cavity 66/dampening chamber 68 hydraulically dampens high frequency movements of the poppet.

At its usual operating frequency of approximately 20–50 Hertz, the poppet 18 moves freely. However, the present invention dampens out undesirable higher frequency movement of the poppet The present invention is not limited to the number of second fluid passages shown. Four passages spaced as shown are merely preferred for best flow characteristics and ease of manufacture. To allow greater flow through the valve 10, additional second fluid passages can be provided.

Different venting means can be used without detracting from this invention. For example, one can provide radial holes rather than a groove 54 in the central portion o the poppet for venting purposes. Those skilled in the art of hydraulics would understand that other structural configurations of the popper and/or the bore would also suffice.

One known use for the valve 10 of the present invention is in a load sensing/pressure compensator circuit. The valve 10 of the present invention is in communication with one end of the spool in a control valve. An orifice is also connected to the valve 10 and the same end of the spool. Thus, if the valve 10 opens, the spool will react to a pressure drop across the orifice and move in one direction or the other. Thus, the valve of the present invention acts as a pilot valve for the control.

An alternate embodiment of the invention is contemplated wherein the vent groove 54 is omitted. In this alternate embodiment, the central portion 46 of the poppet 18 need only comprise a single sealing land 62 extending between the edge 50 and the shoulder 64. The passages 36–40 can be rearranged accordingly to register with the discharge chamber 70 forward of the edge 50.

Whereas the invention has been shown and described in connection with the preferred embodiment thereof, it will be understood that modifications, substitutions, and additions may be made which are within the intended broad scope of the following claims. From the foregoing, it can be seen that the present invention accomplishes at least all of the stated objectives.

What is claimed is:

1. A valve, comprising:
   a body member having spaced apart first and second fluid passages and an elongated bore in communication with the passages, the body member further having a valve seat interposed at one end of the bore between the first and second fluid passages;
   the bore having a discharge chamber disposed between the valve seat and the second fluid passage, and further having a dampening chamber coextensive with a valve spring cavity disposed at the end of the bore distal from the valve seat;
   a poppet having forward and rearward ends disposed in the discharge chamber and dampening chamber of the bore respectively, the poppet including a seating portion at the forward end thereof for engaging the seat, a stem portion at the rearward end, and a raised central portion interposed between the stem portion and the seating portion so as to delimit the discharge chamber and the dampening chamber, the raised central portion being smaller in diameter than the bore and thereby forming a gap therebetween; and
   a spring means disposed in the valve spring cavity for engaging the poppet and yieldingly urging the seating portion into sealing engagement with the seat;
   whereby fluid is permitted to flow from the first fluid passage to the second fluid passage when fluid pressure in the first fluid passage overcomes the force of the spring means and thereby dislodges the seating portion of the poppet from the seat; and
   whereby fluid also flows through the gap and into the dampening chamber to dampen and stabilize the poppet when the poppet is unseated.

2. The valve of claim 1 wherein the central portion of the poppet comprises a cylindrical outer surface having a sealing land thereon and the spring cavity has a cylindrical wall, thereby defining an annular gap between the sealing land and the wall.

3. The valve of claim 2 wherein the annular gap between the wall of the spring cavity and the sealing land comprises a diametrical clearance of approximately 0.07 to 0.21 mm when the sealing land of the poppet has a diameter of approximately 6.9 mm.

4. The valve of claim 1 wherein the central portion of the poppet includes a vent means therein in fluid communication with the second fluid passage.

5. The valve of claim 4 wherein the vent means comprising a groove defined by an annular depression formed on an outer surface of the central portion of the poppet.

6. The valve of claim 5 wherein the central portion of the poppet includes a forward sealing land disposed adjacent a side edge of the annular groove and a rearward sealing land disposed adjacent another side edge of the annular groove, the rear sealing land being guidingly receivable in the spring cavity.

7. The valve of claim 6 wherein the forward sealing land and rearward sealing land are the same size in diameter.

8. The valve of claim 1 wherein the body member includes a plurality of holes therein in communication with the discharge chamber of the bore and being circumferentially spaced around the bore so as to together constitute the second fluid passage.

9. The valve of claim 1 wherein the stem portion of the poppet is cylindrical and a shoulder on the poppet separates the stem portion from the central portion.

10. The valve of claim 9 wherein the spring means is mounted on the stem portion and is engagable with the shoulder.

11. The valve of claim 1 wherein the spring means is a helically coiled compression spring.

12. The valve of claim 1 wherein an adjustment means is interposed between the spring means and the body member so as to adjust the length of the spring means and thereby adjust the force exerted on the poppet by the spring means.

13. The valve of claim 12 wherein the adjustment means comprises an elongated rod having threads thereon for attaching the rod to the body member so that one end of the rod extends longitudinally into the bore and can bear on the spring means and thereby the length of the spring means can be adjusted by rotating the rod.

14. The valve of claim 1 wherein the body member has a outer shell having threads thereon for connection with a hydraulic device and wherein the body member, the poppet, and the spring means contained by the threaded shell constitute a cartridge that is demountably attached to the hydraulic device as an integral unit.

15. A valve, comprising:
   a body member having spaced apart first and second fluid passages and an elongated bore in communication with the passages, the body member further having a valve seat interposed at one end of the bore between the first and second fluid passages;
   the bore having a discharge chamber disposed between the valve seat and the second fluid passage, and further having a dampening chamber coextensive with a valve spring cavity disposed at the end of the bore distal from the valve seat;
   a poppet having forward and rearward ends disposed in the discharge chamber and dampening chamber of the bore respectively, the poppet including a seating portion at the forward end thereof for engaging the seat, a stem portion at the rearward end, and a raised central portion interposed between the stem portion and the seating portion;
   the raised central portion having an outer surface with a sealing land thereon having an annular groove therein;
   the sealing land delimiting the discharge chamber and the dampening chamber;

the annular groove normally being positioned adjacent to and in fluid communication with the second fluid passage so as to constitute a vent means;

a gap being defined between the bore and the sealing land of the poppet so as to partially restrict fluid flow between the discharge chamber and the dampening chamber;

a spring means disposed in the valve spring cavity and the dampening chamber for engaging the poppet and yieldingly urging the seating portion into sealing engagement with the seat;

whereby when fluid pressure in the first fluid passage overcomes the force of the spring means and thereby dislodges the seating portion of the poppet from the seat, a volume of fluid is permitted to flow toward the second fluid passage, a first portion of said volume of fluid leaving the bore through the second fluid passage, a second portion of said volume of fluid flowing from the first fluid passage through the gap and into the dampening chamber to dampen and stabilize the poppet when the poppet is unseated.

16. The valve of claim 15 wherein the sealing land includes a forward sealing land portion disposed adjacent a side edge of the annular groove and a rearward sealing land portion disposed adjacent another side edge of the annular groove, the rear sealing land portion being guidingly receivable in the spring cavity.

* * * * *